United States Patent
Shanmugham

(10) Patent No.: US 6,947,895 B1
(45) Date of Patent: Sep. 20, 2005

(54) DISTRIBUTED SPEECH SYSTEM WITH BUFFER FLUSHING ON BARGE-IN

(75) Inventor: Saravanan Shanmugham, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 828 days.

(21) Appl. No.: 09/930,013

(22) Filed: Aug. 14, 2001

(51) Int. Cl.⁷ .......................... G10L 11/02; H04L 29/00
(52) U.S. Cl. ....................................... 704/270; 370/516
(58) Field of Search ............................ 704/270, 270.1, 704/275; 370/395.1, 516, 517

(56) References Cited

U.S. PATENT DOCUMENTS

| | | | | |
|---|---|---|---|---|
| 5,708,704 A | * | 1/1998 | Fisher | 379/406.08 |
| 5,966,162 A | * | 10/1999 | Goode et al. | 725/90 |
| 6,298,055 B1 | * | 10/2001 | Wildfeuer | 370/352 |
| 6,408,272 B1 | * | 6/2002 | White et al. | 704/270.1 |
| 6,453,020 B1 | * | 9/2002 | Hughes et al. | 379/88.04 |
| 6,621,812 B1 | * | 9/2003 | Chapman et al. | 370/346 |
| 6,697,342 B1 | * | 2/2004 | Smyth et al. | 370/260 |
| 6,725,199 B2 | * | 4/2004 | Brittan et al. | 704/258 |
| 6,801,604 B2 | * | 10/2004 | Maes et al. | 379/88.17 |
| 6,826,173 B1 | * | 11/2004 | Kung et al. | 370/352 |
| 6,836,478 B1 | * | 12/2004 | Huang et al. | 370/352 |

* cited by examiner

Primary Examiner—Martin Lerner
(74) Attorney, Agent, or Firm—Marger Johnson & McCollom, P.C.

(57) ABSTRACT

A distributed automatic speech recognition and text to speech system has components separated by a network. The components may be a voice interface device with jitter buffer, a voice browser and a text to speech engine. A barge-in detection feature may reside in any one of these components, to implement kill on barge in. The system, softwares and methods of the invention operate to flush the jitter buffer of the voice interface device when a barge-in is detected. Any packets that had been received are therefore not played out.

84 Claims, 10 Drawing Sheets

DISTRIBUTED SPEECH SYSTEM WITH BUFFER FLUSHING ON BARGE-IN

BACKGROUND OF THE INVENTION

1. Field of the Invention

The present invention is related to the field of Automatic Speech Recognition and Text To Speech systems, and more specifically to such systems, softwares and methods for improving "Kill on Barge-in" Response Time.

2. Description of the Related Art

Automatic Speech Recognition and Text To Speech (AS-RTTS) systems perform a dual function. They input voice by a user, recognize it, and convert it into text. In addition, they "read out" text, by converting it to voice for the benefit of the user.

Sometimes a user will start speaking when text is being read, which is called a "Barge-In" event. The ASRTTS system must recognize that, and stop reading out text, to better allow the user to continue speaking.

Stopping in this instance is called "kill on barge in". The response time of it is the duration from when the moment the barge-in event is detected, until the user no longer hears a voice.

The kill on barge in response time should be as small as possible. But it is not, due to various factors.

The response time is worse in ASRTTS systems where various components are distributed, and connected to each other via a network. One such example is described below.

Referring to FIG. 1, a distributed ASRTTS system is described. A Voice Interface Device VID includes a codec CC, and a jitter buffer JB. Also it may include a speaker SR for playout, and a microphone MP for receiving voice. The barge-in comes from microphone MP.

The ASRTTS system of FIG. 1 also includes a Voice Browser VB. A ARS/TTS application APPN1 may reside in Voice Browser VB.

The ASRTTS system of FIG. 1 also includes one or more of a Text To Speech (TTS) Media Server TTSMSP, a TTS Engine ETTSP, an Automatic Speech Recognition (ASR) Media Server ASRMS, and an ASR Engine EASR.

The ASRTTS system of FIG. 1 is distributed in that at least two of its components are separated by a network NT. In the embodiment of FIG. 1, at least the TTS Engine ETTSP is separated from Voice Interface Device VID by network NT. Network NT may be any network, such as the internet. Network NT is preferably configured under a Voice over Internet Protocol (VoIP). A connection SA1 is established between TTS Engine ETTSP and Voice Interface Device VID through network NT. Connection SA1 is also known as the media path. For text to speech, audio packets are sent from TTS Engine ETTSP to Voice Interface Device VID via connection SA1.

The problem with the distributed ASRTTS system can now seen more clearly. FIG. 1 represents the instant that, due to the detection of the barge in event, the ETTSP has stopped transmitting audio packets.

Even at that instant, however, it is already too late for some packets. Some audio packets APB are already stored in jitter buffer JB, and will be played out, thus prolonging the effective response time. And some straggler audio packets APS are already in network NT, within connection AS1. When they will reach jitter buffer JB, they will be played out, thus further prolonging the effective response time.

Packets APB and APS are thus latent with respect to the operation of stopping the generation of the audio packets. This latency is inherent in the use of network NT for a distributed ASRTTS system. It is desired to improve the effective response time.

BRIEF SUMMARY OF THE INVENTION

The present invention overcomes these problems and limitations of the prior art.

Generally, the present invention provides distributed ASRTTS system components, softwares and methods. An ASRTTS system includes a voice interface device with jitter buffer, and optionally a voice browser and a TTS engine. A barge-in detection feature may reside in any one of these components, to implement kill on barge in.

When a barge-in is detected, the jitter buffer of the voice interface device is flushed. Any packets that had been received are therefore not played out.

The invention will become more readily apparent from the following Detailed Description, which proceeds with reference to the drawings, in which:

DETAILED DESCRIPTION OF THE PREFERRED EMBODIMENT(S)

As has been mentioned, the present invention provides distributed ASRTTS system components, softwares and methods. The invention is now described in more detail.

Figure 2:
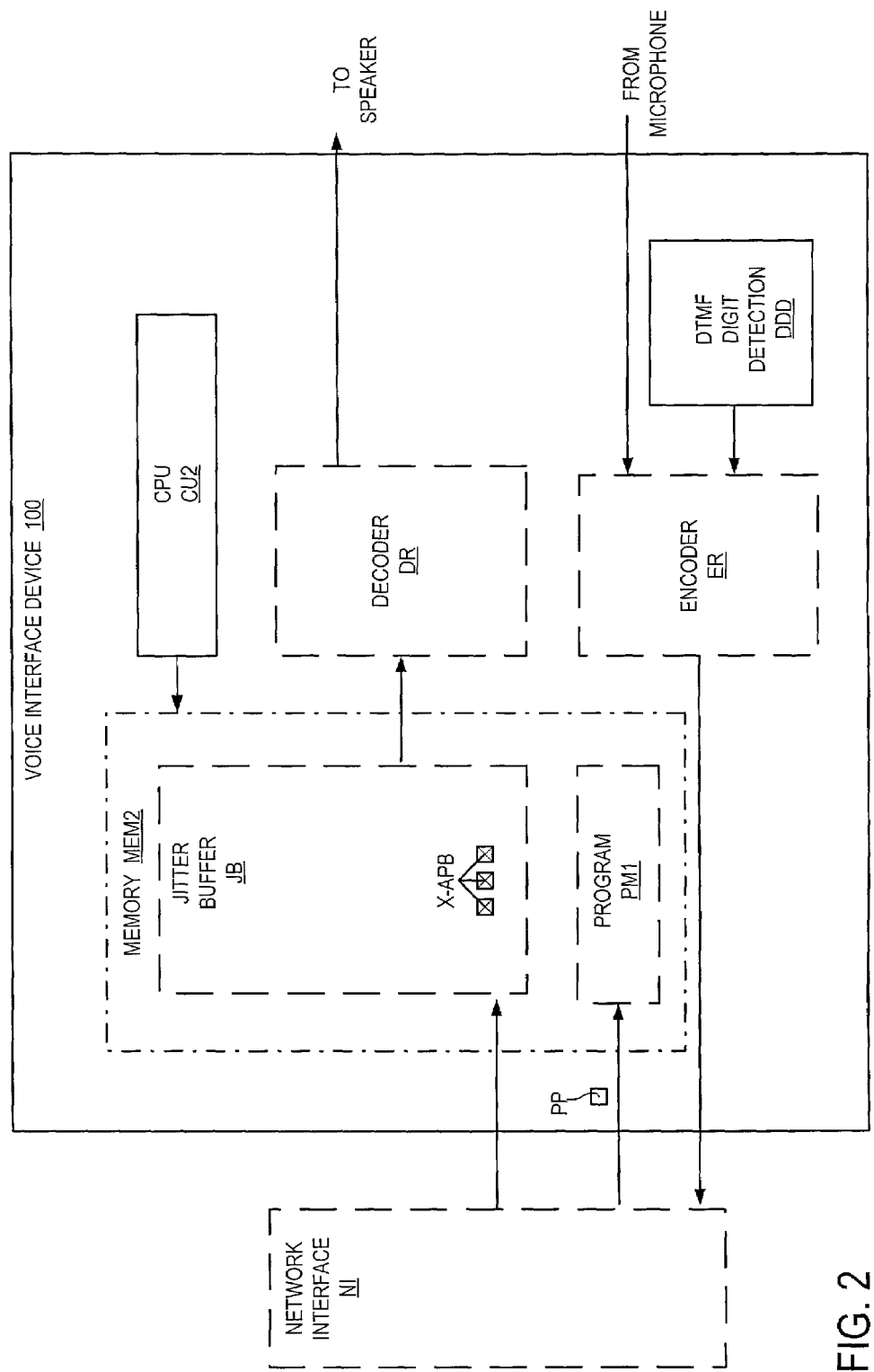
FIG. 2 is a voice interface device made according to an embodiment of the present invention.

Referring now to FIG. 2, a voice interface device 100 made according to an embodiment of the invention is described in more detail. Device 100 may be any device that can transform voice for transmission to and from a network, such as an Internet Protocol (IP) telephone, a voice gateway, etc.

Device 100 has a processor CU2. Processor CU2 may be implemented as a Digital Signal Processor (DSP), Central Processing Unit (CPU), or any other equivalent way known in the art. Device 100 may also include a codec made from an encoder ER (ultimately receiving input from a microphone) and a decoder DR (ultimately outputting to a speaker for the user). These may be implemented as part of a DSP architecture.

Device 100 may additionally include a memory MEM2, on which a program PM1 may reside. Functions of processor CU2 may be controlled by program PM1, as will become apparent from the below. Alternately, at least some of the program may be implemented by DSP.

Device 100 may optionally also include a Dual Tone Multi Frequency (DTMF) Digit Detection feature DDD. It should be kept in mind that the user may barge in either by speaking or by pressing one of the DTMF buttons. Accordingly, the DTMF Digit Detection feature DDD may provide its output to encoder ER, and be implemented in any way known in the art.

Device 100 can work with a network interface NI for interfacing with a network, such as network NT. In such cases, network interface NI may be coupled with processor CU2. In other embodiments, other devices are interposed between device 100 and network interface NI.

Device 100 includes a jitter buffer JB. Jitter buffer JB may be implemented within memory MEM2, although that is not necessary for practicing the invention. Jitter buffer normally receives and stores audio packets until it is time for playout. Audio packets may be received through a network, and more specifically though a media path of the network.

Importantly, jitter buffer JB is configured such that it may be flushed from any stored packets. Such is indicated by showing flushed packets X-APB within jitter buffer JB.

Flushing may happen upon receiving a purge packet PP, although that is not necessary for practicing the invention. Purge packet PP may contain the appropriate instruction, or be part of a suitable protocol. For example, the purge packet may be a Named Signaling Event (NSE) packet. Alternately, the purge packet may be an RTP packet. The purge packet PP may have been sent either through the media path or outside it.

Referring now to FIGS. 3A–3E, the flushing operation is described in more detail, using a graphical analog. In all these Figs., a jitter buffer is depicted as a vertical tube JB, that is open from the top to receive packets.

Figure 3:
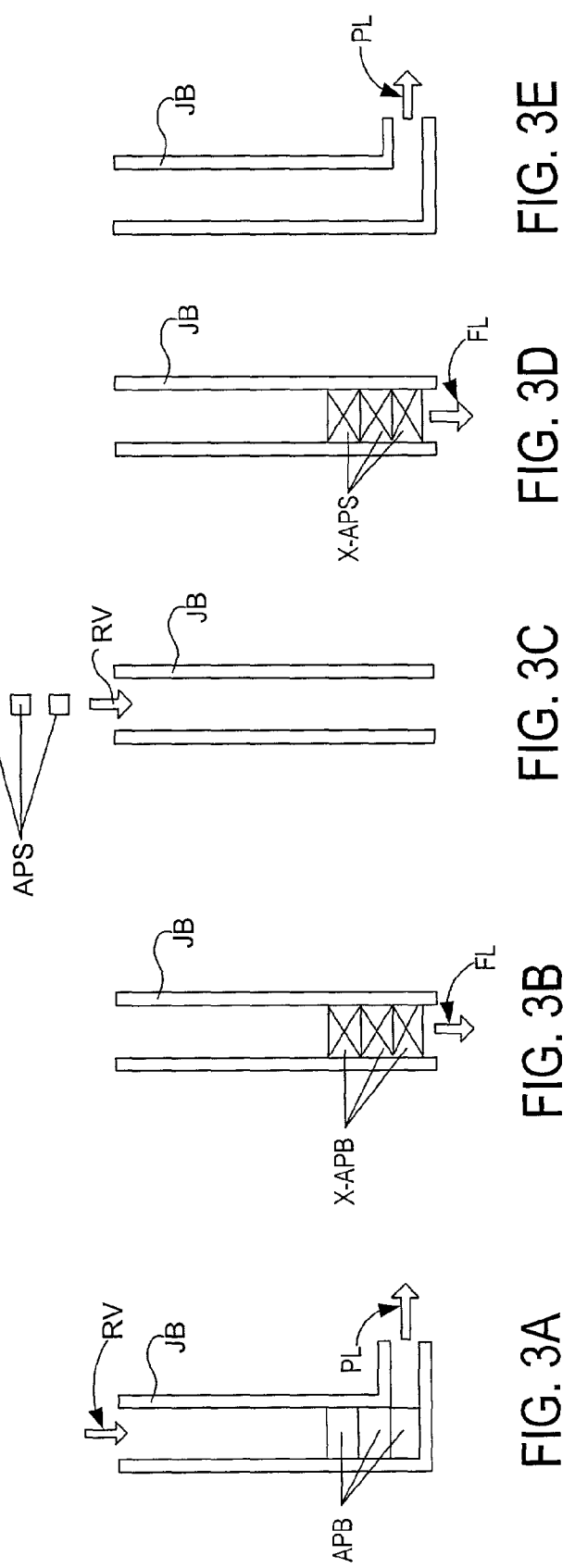
FIGS. 3A–3E are successive snapshots for illustrating a flushing of a jitter buffer according to an embodiment of the present invention.

Referring to FIG. 3A, audio packets APB are received into jitter buffer JB according to arrow RV. Audio packets APB are to be normally played out according to arrow PL.

Referring to FIG. 3B, the audio packets in jitter buffer JB have been renamed X-APB, as instead they are to be flushed without being played out. Flushing occurs according to an arrow FL.

Referring to FIG. 3C, all audio packets have been flushed out of jitter buffer JB. Additional straggler audio packets APS are further received, according to arrow RV.

Referring to FIG. 3D, the straggler audio packets have been renamed as X-APS, as they are also flushed instead of being played out. Flushing occurs according to arrow FL.

Referring to FIG. 3E, flushing stops. Playing out is ready to resume according to arrow PL. But audio packets have stopped coming, since kill on barge in has finally been implemented.

Figure 1:
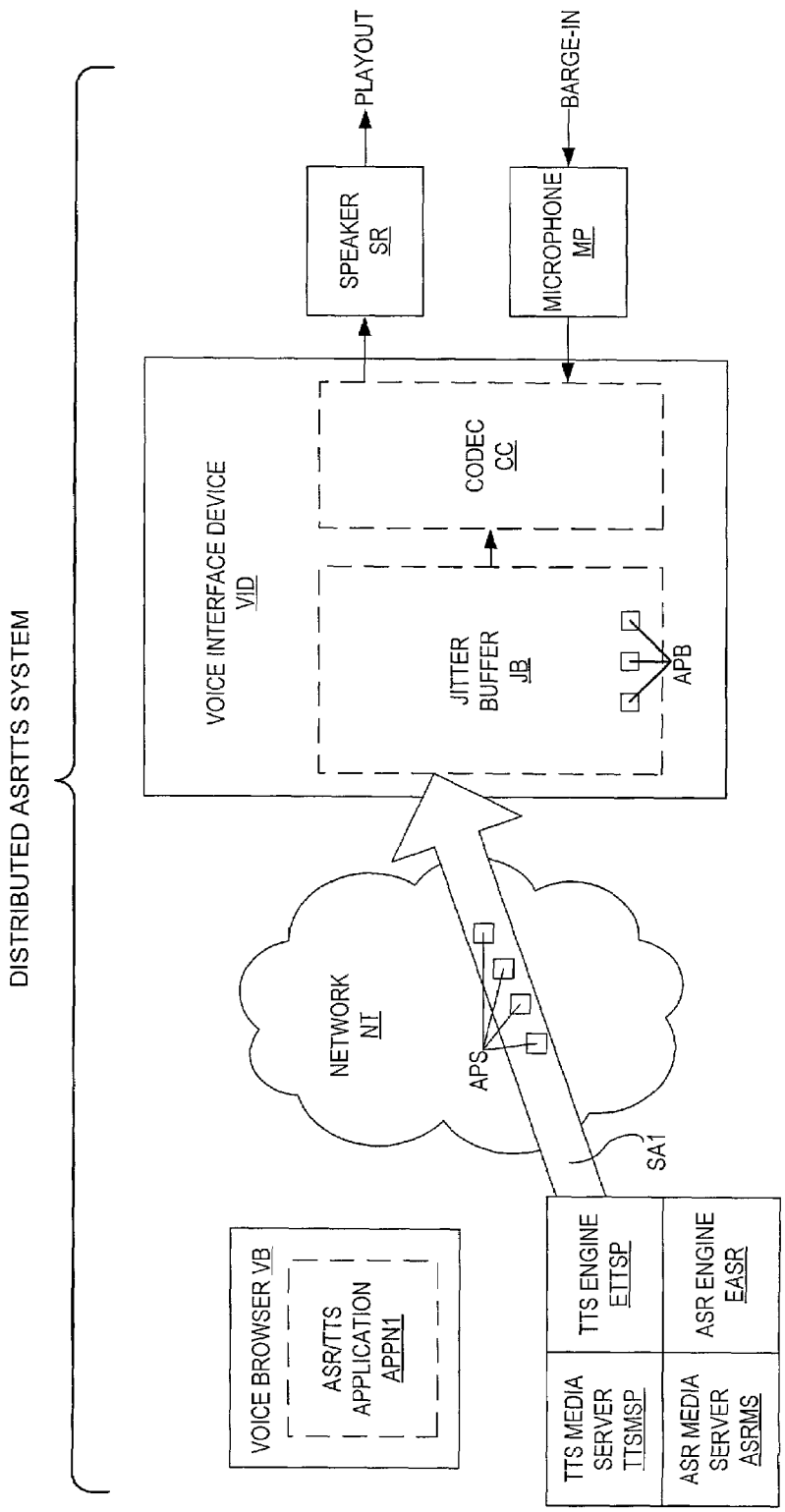
FIG. 1 is a block diagram for illustrating a distributed ASRTTS system in the prior art.

It will be appreciated that, since flushing starts at FIG. 3B according to the invention, no more audio packets are played out. This includes both the stored audio packets APB and also the stragglers APS. Since they are not played out, the kill on barge in response time is effectively shortened, compared to the prior art embodiment of FIG. 1.

FIGS. 4–7 show various embodiments of the invention, along with various possible arrangements. It should be remembered in all of these embodiments and arrangements that the detection of a barge-in event may take place at any one of the shown components. In addition, in all of these embodiments and arrangements, while a Voice Interface Device 100 is shown, such is preferred but not necessary. Indeed, a prior art voice interface device VID may be substituted, if it can obey the flushing command of a purge packet without any special configuration.

Figure 4:
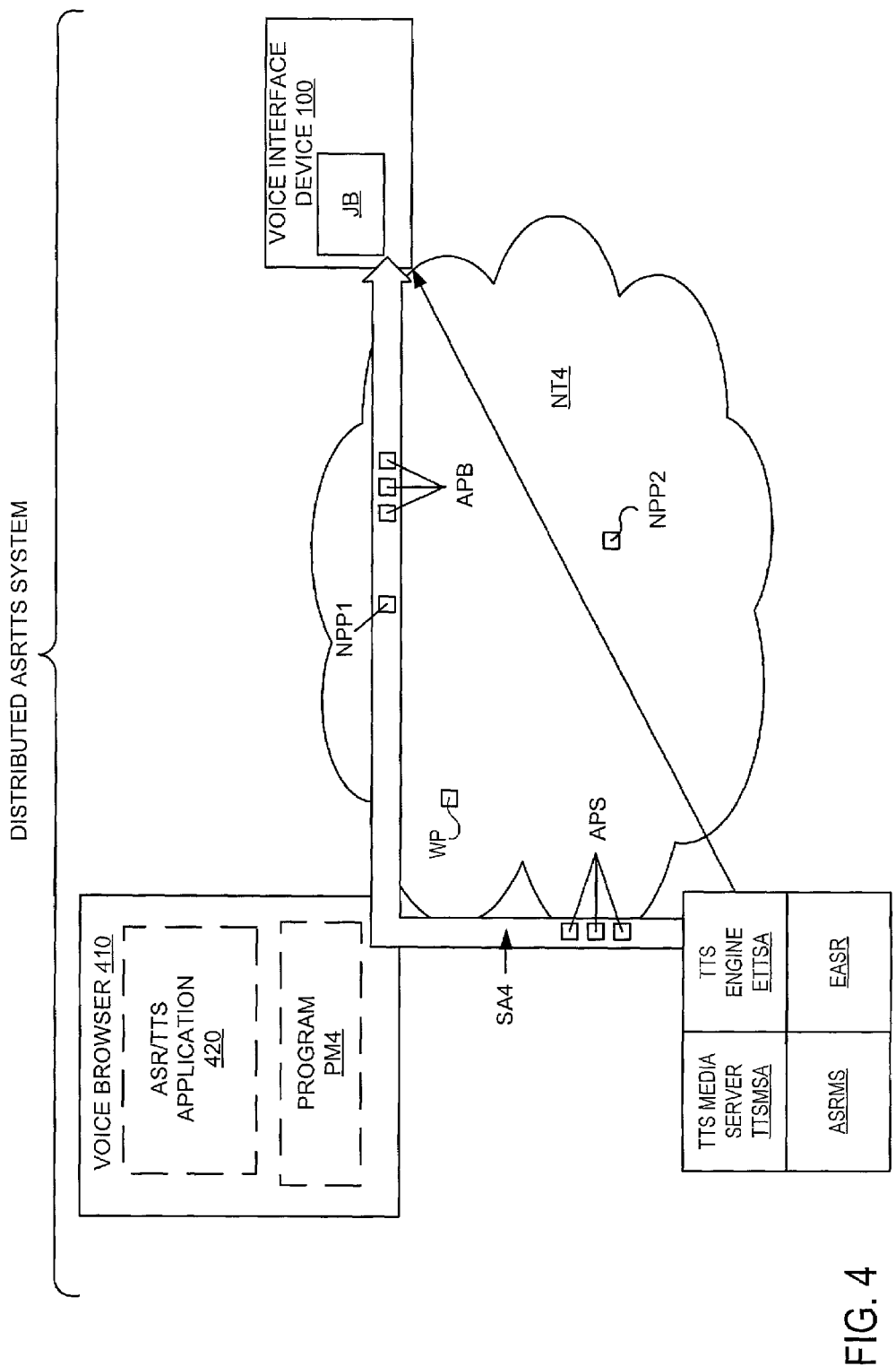
FIG. 4 is a block diagram for illustrating a voice browser made according to a first embodiment of the present invention and a TTS engine being used in a distributed ASRTTS system.

Referring particularly to FIG. 4, a combination of a Text To Speech Media Server TTSMSA and a Text To Speech Engine ETTSA is preferably made according to the invention. The combination supplies audio packets APB, APS to device 100 via an audio stream connection SA4. Text To Speech Engine ETTSA may include a network interface NI, shown in FIG. 2.

Returning to FIG. 4, a voice browser 410 is preferably made according to the invention. Voice browser 410 may include an ASR/TTS application 420 and a program PM4. The functions of program PM4 will be understood from the below. Voice browser 410 may include a network interface NI, shown in FIG. 2.

In FIG. 4, a network NT4 separates all three components (device 100, voice browser 410, and the combination). Audio stream connection SA4 starts from the combination and goes through voice browser 410.

Three cases will be examined in FIG. 4. In the first case, voice browser 410 is made according to the invention, but the combination of Server TTSMSA and Engine ETTSA is not. In the second case, the combination is made according to the invention, but voice browser 410 is not. In the third case, both are made according to the invention.

In all cases, any one device can detect a barge-in event, and notify the others. Moreover, if in FIG. 4 it is voice browser 410 that detected the barge-in, it may send a warning packet WP to the combination of Server TTSMSA and Engine ETTSA. This way the combination would know to stop transmitting.

In the first case, once voice browser 410 is aware of a barge-in event, it can transmit a purge packet NPP1. If purge packet NPP1 is transmitted along connection SA4 without more, it will arrive there after audio packets APB (which will thus be stored in jitter buffer JB), and before audio packets APS (which will thus become stragglers). Accordingly, purge packet NPP1 will operate as seen in FIGS. 3A–3E. Once received, audio packets APB and straggler audio packets APS will be flushed.

It is preferred that purge packet NPP1 be sent with a higher priority than audio packets APB. This way it can reach device 100 faster, even ahead of them. This will further reduce the response time.

In the second case, there will be no purge packet NPP1. Upon learning of the barge-in event, the combination will send a different purge packet NPP2 to device 100. Purge packet NPP2 is preferably sent directly to device 100, not through connection SA4, for expedience. In addition, it is preferably sent with high priority. Once received, audio packets APB and straggler audio packets APS will be flushed.

In the third case, both purge packets NPP 1 and NPP2 are sent. One of them will be received before the other, possibly depending on which component did the detection. The first one to be received will be heeded, while the second one may be discarded, especially if it is confirmed that they relate to the same barge-in event.

Figure 5:
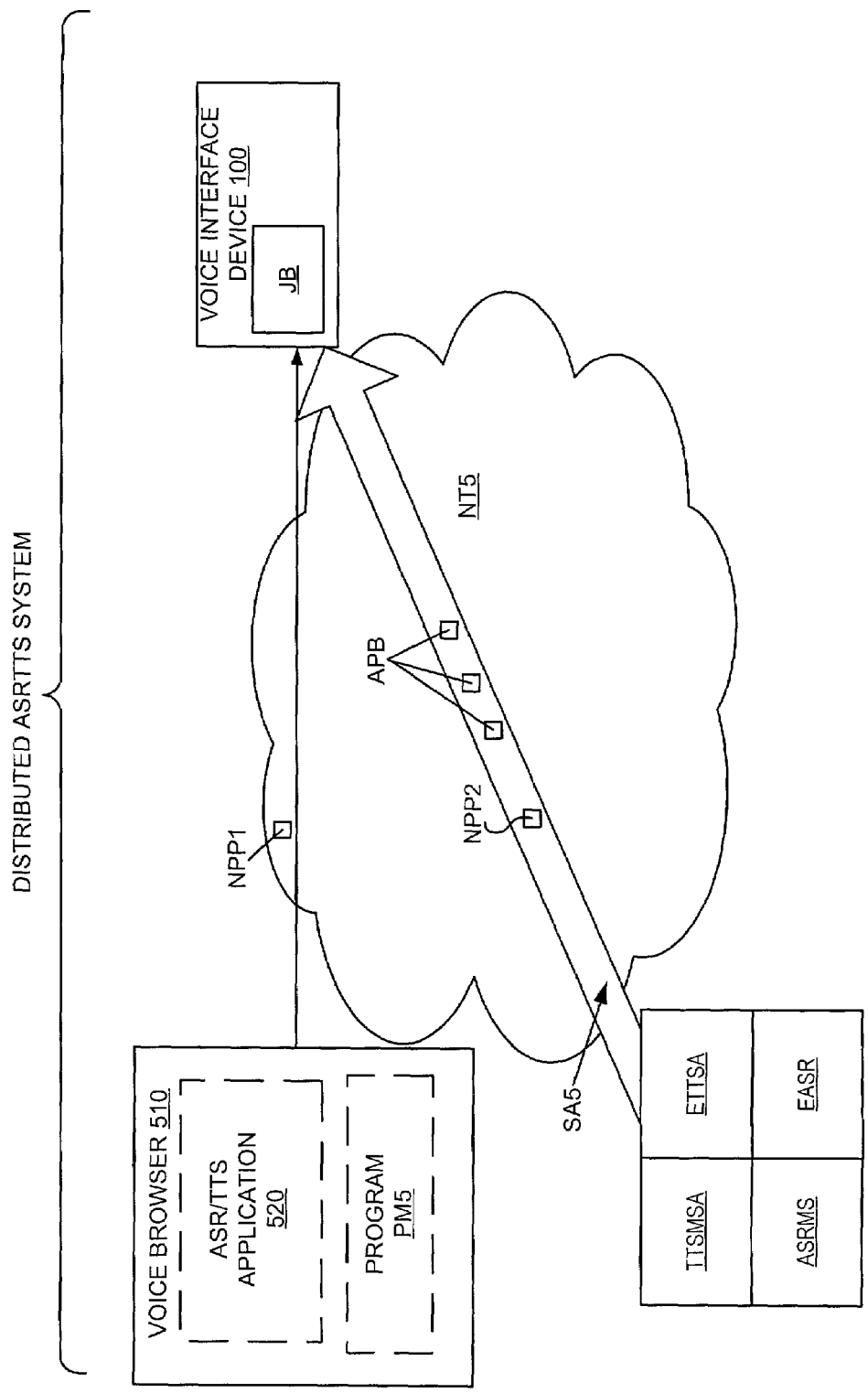
FIG. 5 is a block diagram for illustrating a voice browser made according to a second embodiment of the present invention and a TTS engine being used in a distributed ASRTTS system.

Referring particularly to FIG. 5, a combination of a Text To Speech Media Server TTSMSA and a Text To Speech Engine ETTSA is preferably made according to the invention. The combination supplies audio packets APB, APS to device 100 via an audio stream connection SA5.

A voice browser 510 is preferably made according to the invention. Voice browser 510 may include an ASR/TTS application 520 and a program PM5. The functions of program PM5 will be understood from the below.

In FIG. 5, a network NT5 separates device 100 from the other two components (voice browser 510, and the combination). Audio stream connection SA5 starts from the combination, and goes directly to device 100, not through voice browser 510. That is why it does not matter whether voice browser 510 and the combination are also separated by network NT5, or collocated.

Three cases will be examined in FIG. 5. In the first case, voice browser 510 is made according to the invention, but the combination of Server TTSMSA and Engine ETTSA is not. In the second case, the combination is made according to the invention, but voice browser 510 is not. In the third case, both are made according to the invention. Again, in all cases, any one device can detect a barge-in event, and notify the others.

In the first case, once voice browser 510 is aware of a barge-in event, it can transmit a purge packet NPP1. Once received by device 100, audio packets APB and straggler audio packets APS will be flushed, even if they arrive before it. Again, it is preferred that purge packet NPP1 be sent with a high priority, to further reduce the response time.

In the second case, there will be no purge packet NPP1. Upon learning of the barge-in event, the combination will send a different purge packet NPP2 to device 100. Purge packet NPP2 may be sent to device 100 through connection SA5 or not. In addition, it is preferably sent with higher priority than audio packets APB. Once received, audio packets APB will be flushed. There will be no straggler audio packets, since the combination can stop transmitting as soon as it transmits purge packet NPP2.

In the third case, both purge packets NPP1 and NPP2 are sent. One of them will be received before the other. The first one to be received will be heeded, while the second one may be discarded, especially if it is confirmed that they relate to the same barge-in event.

Figure 6:
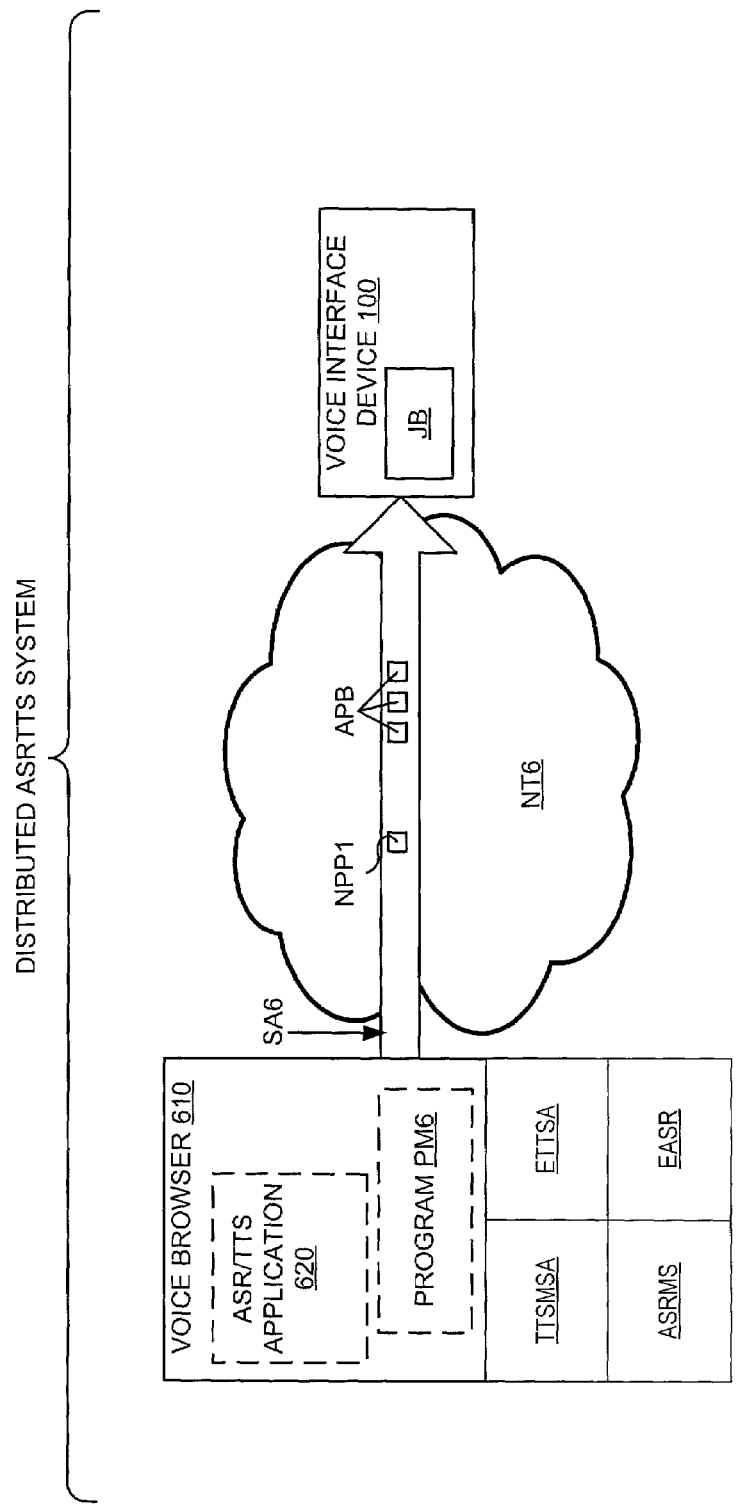
FIG. 6 is a block diagram for illustrating a voice browser made according to a third embodiment of the present invention being used in a distributed ASRTTS system.

Referring particularly to FIG. 6, a combination of a Text To Speech Media Server TTSMSA and a Text To Speech Engine ETTSA is preferably made according to the invention. The combination supplies audio packets APB to device 100 via an audio stream connection SA6.

A voice browser 610 is preferably made according to the invention. Voice browser 610 may include an ASR/TTS application 620 and a program PM6. The functions of program PM6 will be understood from the below.

In FIG. 6, voice browser 610 and the combination are explicitly collocated. They are separated from device 100 by a network NT6. Audio stream connection SA6 starts from the combination, and goes directly to device 100. Once a barge-in event is detected, a purge packet NPP1 may be transmitted. It may be transmitted within, or outside audio stream connection SA6, and preferably with high priority.

Once purge packet NPP1 is received, audio packets APB will be flushed. There will be no audio packets transmitted after audio packets APB, since the combination can stop transmitting as soon as it transmits purge packet NPP 1.

Figure 7:
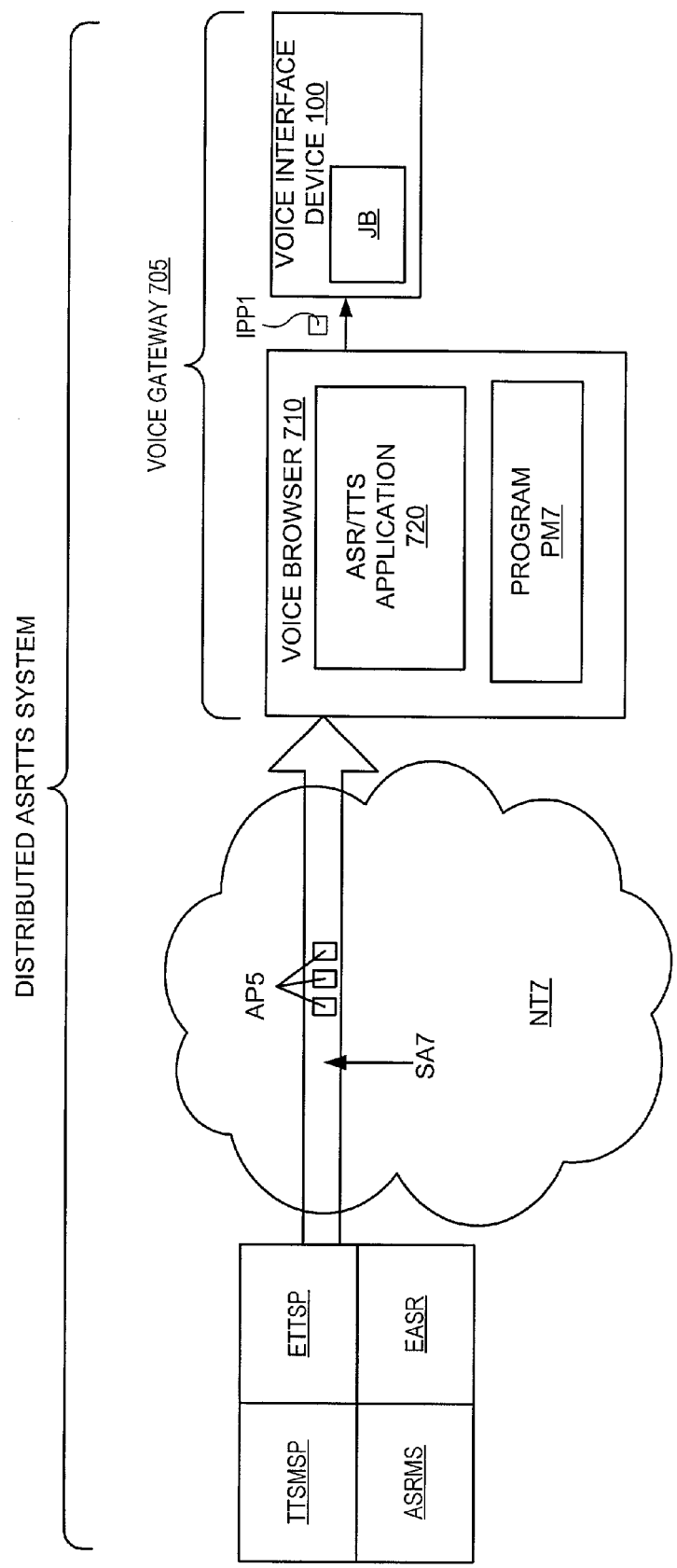
FIG. 7 is a block diagram for illustrating a voice browser made according to a fourth embodiment of the present invention being used in a distributed ASRTTS system.

Referring particularly to FIG. 7, a voice gateway 705 may include voice interface device 100 and a voice browser 710. In this case, voice browser 710 may be between device 100 and the network interface NI of FIG. 2.

Voice browser 710 is preferably made according to the invention. Voice browser 710 may include an ASR/TTS application 720 and a program PM7. The functions of program PM7 will be understood from the below.

In addition, a combination of a Text To Speech Media Server TTSMSA and a Text To Speech Engine ETTSA may be made according to the invention. The combination supplies audio packets APS to device 100 via an audio stream connection SA7.

It is highly preferred that voice browser 710 perform the barge-in detection. In that case, the combination need not be made according to the invention, but according to the prior art. This arrangement will avoid the network inherency.

Once barge-in is detected voice browser 710 may send an internal purge signal IPP1 to device 100. It may be configured as a packet, or other type of electronic signal. Once received, it can instruct jitter buffer JB to discard any subsequently arriving audio packets APS. There may be very few stored packets to flush, since purge signal IPP1 will reach device 100 much faster than the purge packets NPP1, NPP2 of the previous embodiments.

Figure 8:
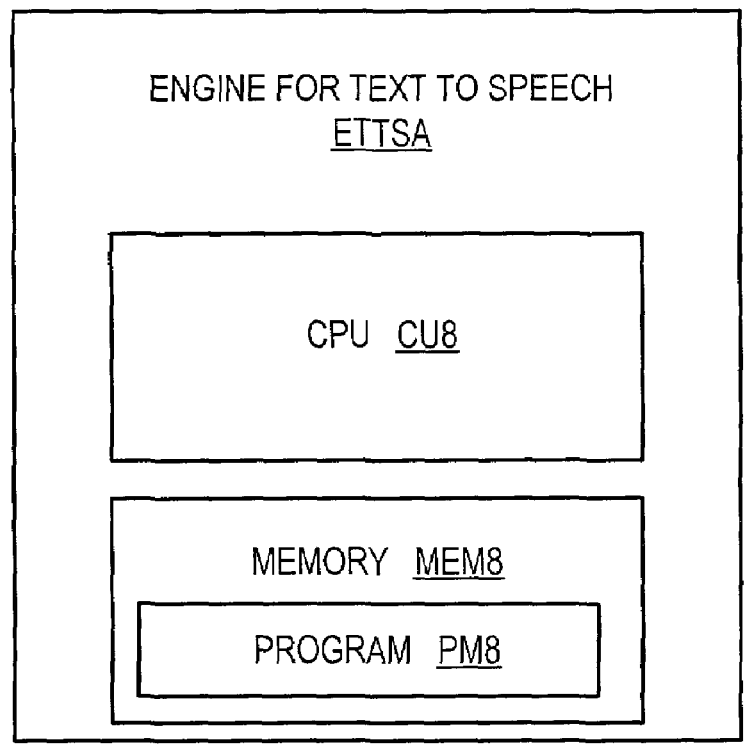
FIG. 8 is a block diagram for illustrating a TTS engine made according to an embodiment of the present invention.

Referring now to FIG. 8, a Text To Speech Engine ETTSA made according to the invention is described in more detail. Engine ETTSA Device 100 has a processor CU8. Processor CU8 may be implemented as a Digital Signal Processor (DSP), Central Processing Unit (CPU), or any other equivalent way known in the art. It may also include a memory MEM8, on which a program PM8 may reside. The functions of program PM8 will be understood from the below.

The present invention may be implemented by one or more devices that include logic circuitry. The device performs functions and/or methods as are described in this document. The logic circuitry may include a processor that may be programmable for a general purpose, or dedicated, such as microcontroller, a microprocessor, a Digital Signal Processor (DSP), etc. For example, the device may be a digital computer like device, such as a general-purpose computer selectively activated or reconfigured by a computer program stored in the computer.

Moreover, the invention additionally provides methods, which are described below. The methods and algorithms presented herein are not necessarily inherently associated with any particular computer or other apparatus. Rather, various general-purpose machines may be used with programs in accordance with the teachings herein, or it may prove more convenient to construct more specialized apparatus to perform the required method steps. The required structure for a variety of these machines will become apparent from this description.

In all cases there should be borne in mind the distinction between the method of the invention itself and the method of operating a computing machine. The present invention relates both to methods in general, and also to steps for operating a computer and for processing electrical or other physical signals to generate other desired physical signals.

The invention additionally provides programs, and methods of operation of the programs. A program is generally defined as a group of steps leading to a desired result, due to their nature and their sequence. A program made according to an embodiment of the invention is most advantageously implemented as a program for a computing machine, such as a general-purpose computer, a special purpose computer, a microprocessor, etc.

The invention also provides storage media that, individually or in combination with others, have stored thereon instructions of a program made according to the invention. A storage medium according to the invention is a computer-readable medium, such as a memory, and is read by the computing machine mentioned above.

The steps or instructions of a program made according to an embodiment of the invention requires physical manipulations of physical quantities. Usually, though not necessarily, these quantities may be transferred, combined, compared, and otherwise manipulated or processed according to the instructions, and they may also be stored in a computer-readable medium. These quantities include, for example electrical, magnetic, and electromagnetic signals, and also states of matter that can be queried by such signals. It is convenient at times, principally for reasons of common usage, to refer to these quantities as bits, data bits, samples, values, symbols, characters, images, terms, numbers, or the like. It should be borne in mind, however, that all of these and similar terms are associated with the appropriate physical quantities, and that these terms are merely convenient labels applied to these physical quantities, individually or in groups.

This detailed description is presented largely in terms of flowcharts, display images, algorithms, and symbolic representations of operations of data bits within at least one computer readable medium, such as a memory. An economy is achieved in the present document in that a single set of flowcharts is used to describe both methods of the invention, and programs according to the invention. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Often, for the sake of convenience only, it is preferred to implement and describe a program as various interconnected distinct software modules or features, individually and collectively also known as software and softwares. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

In the present case, methods of the invention are implemented by machine operations. In other words, embodiments of programs of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described.

Figure 9:
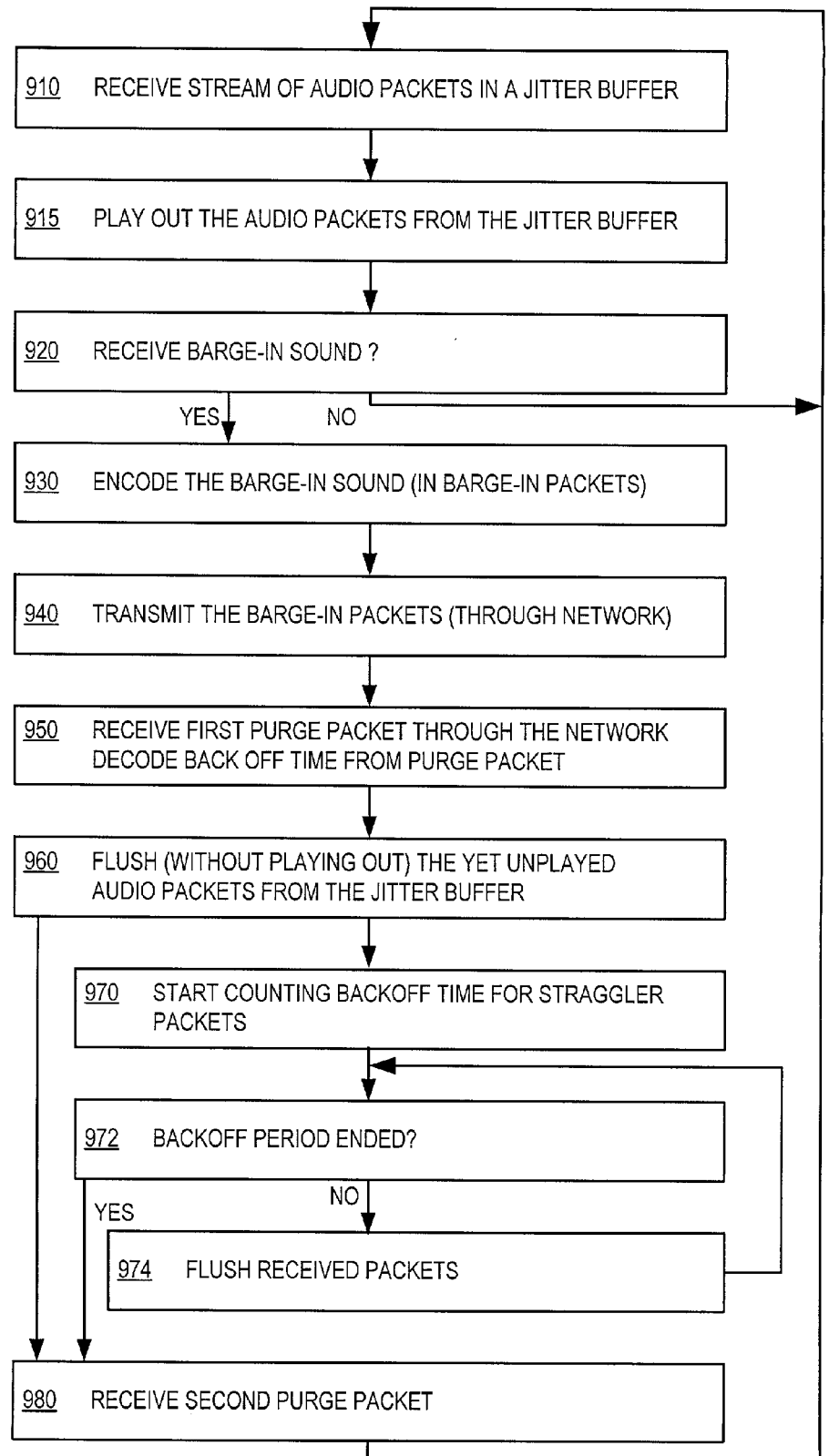
FIG. 9 is a flowchart illustrating a method according to an embodiment of the present invention.

Referring now to FIG. 9, a flowchart 900 is used to illustrate a method according to an embodiment of the invention. The method of flowchart 900 may also be practiced by voice interface device 100.

According to a box 910, a stream of audio packets is received in a jitter buffer.

According to a next box 915, the audio packets are played out from the jitter buffer to a speaker.

According to an optional next box 920, it is inquired whether a barge-in sound has been received. It may be from a microphone or a DTMF keypad. If not, Execution returns to box 910.

If yes, then according to an optional next box 930, the barge-in sound is encoded. Encoding can be as a signal, analog or digital. Encoding may also be in packets for network transmission, which are also called barge-in packets.

According to an optional next box 940, the encoded barge-in sound is transmitted. Transmission can be as a signal if it is to a collocated device, or through a network, if the barge in sound is encoded as barge in packets.

The encoded barge-in sound is transmitted to the component that performs barge-in detection. If it is device 100 that performs it, it need not be transmitted, or even encoded for that matter. That is why these steps are listed as optional. Once the encoded barge-in sound is transmitted, barge-in detection may take place.

Once the barge-in detection takes place, it is optionally first confirmed that a kill-on-barge-in prompt is playing. If not, no flushing will be necessary. If yes, the jitter buffer is flushed. This may take place by first having other actions take place, as follows.

According to an optional next box 950, a first purge packet is received, possibly through the network. It can also be received as a signal. Flushing will be in response to the first purge packet. The purge packet may encode an instruction to flush the jitter buffer. It may be an RTP packet or a NSE packet.

Optionally at this stage, a back off time is decoded from the first purge packet. Alternately, a backoff time may be considered standard.

According to an optional next box 960, the yet unplayed audio packets are flushed from the jitter buffer, without playing them out. This way the user hears nothing.

If a backoff time has been decoded from the first purge packet at box 950, then according to an optional next box 970, a backoff time starts being counted for straggler packets. Alternately, a backoff time may be known by default, e.g. 500 msec.

According to a next box 972, it is inquired whether the backoff period has ended. If not, then according to a next box 974, any additional audio packets received in the jitter buffer are also flushed. Of interest may be that these additional audio packets may simply be redundant packets of those flushed.

When the backoff period ends, according to an optional next box 980, a second purge packet may be received. It may be ignored. Alternately, it is first confirmed that the two packets relate to the same barge in event. This may be accomplished by comparing a synchronization identification aspect of the two purge packets, and only ignoring the second if there is a match.

Figure 10:
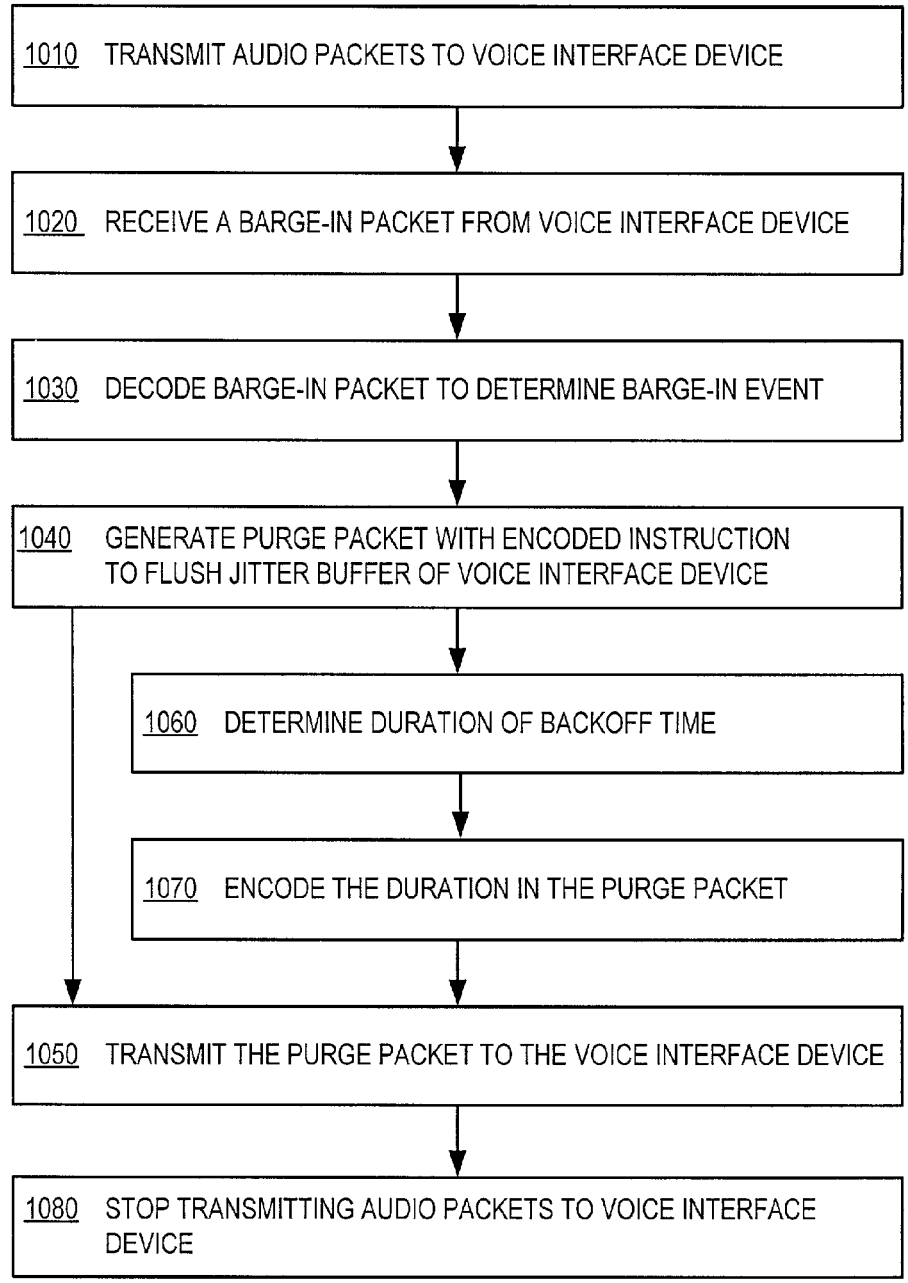
FIG. 10 is a flowchart illustrating a method according to another embodiment of the present invention.

Referring now to FIG. 10, a flowchart 1000 is used to illustrate a method according to another embodiment of the invention. The method of flowchart 1000 may also be practiced by a text to speech engine, by a voice browser, etc. It will become apparent that the method of flowchart 1000 is a composite, and various components of it can also be practiced by themselves.

According to a box 1010, audio packets are optionally transmitted to voice interface device, depending on the application.

According to an optional next box 1020, a barge-in packet is received from the voice interface device. This facilitates detection of a barge in event, if the feature is provided. According to an optional next box 1030, the barge-in packet is decoded, to determine a barge-in event.

According to an optional next box 1040, a purge packet is generated. It may contain an explicit encoded instruction to flush jitter buffer of voice interface device. Or it may be according to a protocol, as discussed elsewhere in this document. Optionally it is first confirmed that a kill-on-barge-in prompt is playing prior to generating the purge packet.

According to an optional next box 1050, the purge packet is transmitted to the voice interface device. It may be sent through the media path, or outside it. It is preferably transmitted at high priority.

Optionally, prior to box 1050, according to a box 1060, a duration is determined of a backoff time. That may be computed from an expected round trip time, depending on the configuration. According to a next box 1070, the duration is encoded in the purge packet.

After box 1050, according to a next box 1080, transmission of audio packets to voice interface device is stopped, if made in the first place at box 1010. This step may take place before hand, but that is not preferred. The highest urgency is to transmit the purge packet.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A device comprising:
   a jitter buffer; and
   a processor coupled with the jitter buffer, wherein the processor is adapted to receive a stream of audio packets in the jitter buffer,
   play out the audio packets from the jitter buffer;
   receive barge-in sound while playing out the audio packets;
   encode and transmitting the barge in sound; and
   flush without playing out at least some of the yet unplayed audio packets from the jitter buffer in response to transmitting the barge-in sound.

2. The device of claim 1, wherein the processor is further adapted to:
   confirm that a kill-on-barge-in prompt is playing prior to flushing.

3. The device of claim 1, wherein the barge-in sound is encoded in a barge-in packet that is transmitted through a network.

4. The device of claim 1, wherein the processor is further adapted to:
   receive a first purge packet through the network in response to the barge-in packet,
   wherein flushing the jitter buffer is performed in response to the first purge packet.

5. The device of claim 4, wherein
   the purge packet encodes an instruction to flush the jitter buffer.

6. The device of claim 4, wherein
   the purge packet is a Real Time Transfer Protocol packet.

7. The device of claim 4, wherein
   the purge packet is a Named Signaling Event packet.

8. The device of claim 4, wherein the processor is further adapted to:
   receive a second purge packet through the network; and
   ignore the second purge packet.

9. The device of claim 8, wherein the processor is further adapted to:
   compare a synchronization identification aspect of the second purge packet to a corresponding aspect of the first purge packet,
   wherein ignoring the second purge packet takes place only if there is a match.

10. The device of claim 1, wherein the processor is further adapted to:
    receive an additional audio packet after flushing the yet unplayed audio packets from the jitter buffer; and
    flush the additional packet without playing it out.

11. The device of claim 10, wherein the processor is further adapted to:
    start counting a backoff period of a first duration after flushing the yet unplayed audio packets; and
    flush without playing out all packets received in the jitter buffer for the first duration.

12. The device of claim 11, wherein the processor is further adapted to:
    receive a first purge packet through the network; and
    decode from the purge packet the first duration.

13. A device comprising:
    a network interface for coupling to a network; and
    a processor coupled with the network interface, wherein the processor is adapted to detect a barge-in event;
    responsive to the barge-in event, generate a purge packet; and
    transmit the purge packet through a network to a voice interface device having a jitter buffer,
    wherein the purge packet is for flushing the jitter buffer upon being received.

14. The device of claim 13, wherein the processor is further adapted to:
    confirm that a kill-on-barge-in prompt is playing prior to generating the purge packet.

15. The device of claim 13, wherein
    the purge packet is an Named Signaling Event packet.

16. The device of claim 13, wherein the processor is further adapted to:
    transmit audio packets to the voice interface device through a media path, and
    wherein the purge packet is an Real Time Transfer Protocol packet, and sent through the media path.

17. The device of claim 13, wherein
    the purge packet is transmitted with a higher priority than the audio packets.

18. The device of claim 13, wherein the processor is further adapted to:
receive a barge-in packet; and
decode the barge-in packet to detect the barge-in event.

19. The device of claim 18, wherein
a barge-in sound is decoded from the barge-in packet, and
the barge-in sound is one of a voice and a DTMF sound.

20. The device of claim 13, wherein the processor is further adapted to:
encode a first duration in the purge packet.

21. The device of claim 20, wherein the processor is further adapted to:
determine the first duration.

22. A device comprising:
means for receiving a stream of audio packets in a jitter buffer;
means for playing out the audio packets from the jitter buffer;
means for receiving barge-in sound while playing out the audio packets;
means for encoding and transmitting the barge in sound; and
means for flushing without playing out at least some of the yet unplayed audio packets from the jitter buffer in response to transmitting the barge-in sound.

23. The device of claim 22, further comprising:
means for confirming that a kill-on-barge-in prompt is playing prior to flushing.

24. The device of claim 22, wherein
the barge-in sound is encoded in a barge-in packet that is transmitted through a network.

25. The device of claim 22, further comprising:
means for receiving a first purge packet through the network in response to the barge-in packet,
wherein flushing the jitter buffer is performed in response to the first purge packet.

26. The device of claim 25, wherein
the purge packet encodes an instruction to flush the jitter buffer.

27. The device of claim 25, wherein
the purge packet is a Real Time Transfer Protocol packet.

28. The device of claim 25, wherein
the purge packet is a Named Signaling Event packet.

29. The device of claim 25, further comprising:
means for receiving a second purge packet through the network; and
means for ignoring the second purge packet.

30. The device of claim 29, further comprising:
means for comparing a synchronization identification aspect of the second purge packet to a corresponding aspect of the first purge packet,
wherein ignoring the second purge packet takes place only if there is a match.

31. The device of claim 22, wherein further comprising:
means for receiving an additional audio packet after flushing the yet unplayed audio packets from the jitter buffer; and
means for flushing the additional packet without playing it out.

32. The device of claim 31, further comprising:
means for starting to count a backoff period of a first duration after flushing the yet unplayed audio packets; and
means for flushing without playing out all packets received in the jitter buffer for the first duration.

33. The device of claim 32, further comprising:
means for receiving a first purge packet through the network; and
means for decoding from the purge packet the first duration.

34. A device comprising;
means for detecting a barge-in event;
means for responsive to the barge-in event, generating a purge packet; and
means for transmitting the purge packet through a network to a voice interface device having a jitter buffer, wherein the purge packet is for flushing the jitter buffer upon being received.

35. The device of claim 34, further comprising:
means for confirming that a kill-on-barge-in prompt is playing prior to generating the purge packet.

36. The device of claim 34, wherein
the purge packet is an Named Signaling Event packet.

37. The device of claim 34, further comprising:
means for transmitting audio packets to the voice interface device through a media path, and
wherein the purge packet is an Real Time Transfer Protocol packet, and sent through the media path.

38. The device of claim 34, wherein
the purge packet is transmitted with a higher priority than the audio packets.

39. The device of claim 34, father comprising:
means for receiving a barge-in packet; and
means for decoding the barge-in packet to detect the barge-in event.

40. The device of claim 39, wherein
a barge-in sound is decoded from the barge-in packet, and
the barge-in sound is one of a voice and a DTMF sound.

41. The device of claim 34, further comprising:
means for encoding a first duration in the purge packet.

42. The device of claim 41, further comprising:
means for determining the first duration.

43. An article comprising: a storage medium, the storage medium having instructions stored thereon, wherein when the instructions are executed by at least one device, they result in:
receiving a stream of audio packets in a jitter buffer;
playing out the audio packets from the jitter buffer;
receiving barge-in sound while playing out the audio packets;
encoding and transmitting the barge in sound; and
flushing without playing out at least some of the yet unplayed audio packets from the jitter buffer in response to transmitting the barge-in sound.

44. The article of claim 43, wherein the instructions further result in:
confirming that a kill-on-barge-in prompt is playing prior to flushing.

45. The article of claim 43, wherein
the barge-in sound is encoded in a barge-in packet that is transmitted through a network.

46. The article of claim 43, wherein the instructions further result in:
receiving a first purge packet through the network in response to the barge-in packet,
wherein flushing the jitter buffer is performed in response to the first purge packet.

47. The article of claim 46, wherein
the purge packet encodes an instruction to flush the jitter buffer.

48. The article of claim 46, wherein
the purge packet is a Real Time Transfer Protocol packet.

49. The article of claim 46, wherein
the purge packet is a Named Signaling Event packet.

50. The article of claim 46, wherein the instructions further result in:
receiving a second purge packet through the network; and
ignoring the second purge packet.

51. The article of claim 50, wherein the instructions further result in:
comparing a synchronization identification aspect of the second purge packet to a corresponding aspect of the first purge packet,
wherein ignoring the second purge packet takes place only if there is a match.

52. The article of claim 43, wherein the instructions further result in:
after flushing the yet unplayed audio packets from the jitter buffer, receiving an additional audio packet; and
flushing the additional packet without playing it out.

53. The article of claim 52, wherein the instructions further result in:
after flushing the yet unplayed audio packets, starting to count a backoff period of a first duration; and
flushing without playing out all packets received in the jitter buffer for the first duration.

54. The article of claim 53, wherein the instructions further result in:
receiving a first purge packet through the network; and
decoding from the purge packet the first duration.

55. An article comprising: a storage medium, the storage medium having instructions stored thereon, wherein when the instructions are executed by at least one device, they result in:
detecting a barge-in event;
responsive to the barge-in event, generating a purge packet; and
transmitting the purge packet through a network to a voice interface device having a jitter buffer,
wherein the purge packet is for flushing the jitter buffer upon being received.

56. The article of claim 55, wherein the instructions further result in:
confirming that a kill-on-barge-in prompt is playing prior to generating the purge packet.

57. The article of claim 55, wherein
the purge packet is an Named Signaling Event packet.

58. The article of claim 55, wherein the instructions further result in:
transmitting audio packets to the voice interface device through a media path, and
wherein the purge packet is an Real Time Transfer Protocol packet, and sent through the media path.

59. The article of claim 55, wherein
the purge packet is transmitted with a higher priority than the audio packets.

60. The article of claim 55, wherein the instructions further result in:
receiving a barge-in packet; and
decoding the barge-in packet to detect the barge-in event.

61. The article of claim 60, wherein
a barge-in sound is decoded from the barge-in packet, and the barge-in sound is one of a voice and a DTMF sound.

62. The article of claim 55, wherein the instructions further result in:
encoding a first duration in the purge packet.

63. The article of claim 62, wherein the instructions further result in:
determining the first duration.

64. A method comprising:
receiving a stream of audio packets in a jitter buffer;
playing out the audio packets from the jitter buffer;
receiving bargain sound while playing out the audio packets;
encoding and transmitting the barge in sound; and
flushing without playing out at least some of the yet unplayed audio packets from the jitter buffer in response to transmitting the barge-in sound.

65. The method of claim 64, further comprising:
confirming that a kill-on-barge-in prompt is playing prior to flushing.

66. The method of claim 64, wherein
the barge-in sound is encoded in a barge-in packet that is transmitted through a network.

67. The method of claim 64, further comprising:
receiving a first purge packet through the network in response to the barge-in packet,
wherein flushing the jitter buffer is performed in response to the first purge packet.

68. The method of claim 67, wherein
the purge packet encodes an instruction to flush the jitter buffer.

69. The method of claim 67, wherein
the purge packet is a Real Time Transfer Protocol packet.

70. The method of claim 67, wherein
the purge packet is a Named Signaling Event packet.

71. The method of claim 67, further comprising:
receiving a second purge packet through the network; and
ignoring the second purge packet.

72. The method of claim 71, further comprising:
comparing a synchronization identification aspect of the second purge packet to a corresponding aspect of the first purge packet,
wherein ignoring the second purge packet takes place only if there is a match.

73. The method of claim 64, further comprising:
after flushing the yet unplayed audio packets from the jitter buffer, receiving an additional audio packet; and
flushing the additional packet without playing it out.

74. The method of claim 73, further comprising:
after flushing the yet unplayed audio packets, starting to count a backoff period of a first duration; and
flushing without playing out all packets received in the jitter buffer for the first duration.

75. The method of claim 74, further comprising:
receiving a first purge packet through the network; and
decoding from the purge packet the first duration.

76. A method comprising:
detecting a barge-in event;
responsive to the barge-in event, generating a purge packet; and
transmitting the purge packet through a network to a voice interface device having a jitter buffer,
wherein the purge packet is for flushing the jitter buffer upon being received.

77. The method of claim 76, further comprising:
confirming that a kill-on-barge-in prompt is playing prior to generating the purge packet.

78. The method of claim 76, wherein
the purge packet is an Named Signaling Event packet.

79. The method of claim 76, further comprising:
transmitting audio packets to the voice interface device through a media path, and
wherein the purge packet is an Real Time Transfer Protocol packet, and sent through the media path.

80. The method of claim 76, wherein
the purge packet is transmitted with a higher priority than the audio packets.

81. The method of claim 76, further comprising:
receiving a barge-in packet; and
decoding the barge-in packet to detect the barge-in event.

82. The method of claim 81, wherein
a barge-in sound is decoded from the barge-in packet, and
the barge-in sound is one of a voice and a DTMF sound.

83. The method of claim 76, further comprising:
encoding a first duration in the purge packet.

84. The method of claim 83, farther comprising:
determining the first duration.

* * * * *

UNITED STATES PATENT AND TRADEMARK OFFICE
CERTIFICATE OF CORRECTION

| | | |
|---|---|---|
| PATENT NO. | : 6,947,895 B1 | Page 1 of 1 |
| APPLICATION NO. | : 09/930013 | |
| DATED | : September 20, 2005 | |
| INVENTOR(S) | : Shanmugham | |

It is certified that error appears in the above-identified patent and that said Letters Patent is hereby corrected as shown below:

At column 12, line 27, please replace "father comprising" with --further comprising--

At column 14, line 4, please replace "bargain sound" with --barge-in sound--

At column 16, line 7, please replace "farther comprising" with --further comprising--

Signed and Sealed this

Twenty-sixth Day of December, 2006

JON W. DUDAS
*Director of the United States Patent and Trademark Office*